(12) United States Patent
Noda

(10) Patent No.: US 7,206,871 B2
(45) Date of Patent: Apr. 17, 2007

(54) EXTENDING CIRCUIT FOR MEMORY AND TRANSMITTING-RECEIVING DEVICE USING EXTENDING CIRCUIT FOR MEMORY

(75) Inventor: Hiroyasu Noda, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 356 days.

(21) Appl. No.: 10/724,045

(22) Filed: Dec. 1, 2003

(65) Prior Publication Data

US 2004/0111542 A1   Jun. 10, 2004

(30) Foreign Application Priority Data

Dec. 2, 2002   (JP) ............................. 2002-349430

(51) Int. Cl.
   *G06F 3/00* (2006.01)

(52) U.S. Cl. .......................................... 710/52; 710/57

(58) Field of Classification Search ................... 710/8, 710/10, 14, 104, 305, 306, 313, 52, 57; 713/1, 713/2, 100

See application file for complete search history.

(56) References Cited

U.S. PATENT DOCUMENTS

| | | | | |
|---|---|---|---|---|
| 4,463,443 A | * | 7/1984 | Frankel et al. ................. | 710/60 |
| 5,809,521 A | * | 9/1998 | Steinmetz et al. .......... | 711/116 |
| 5,956,492 A | * | 9/1999 | Jander et al. ............... | 710/106 |
| 5,982,772 A | * | 11/1999 | Oskouy .................... | 370/395.7 |
| 6,055,285 A | * | 4/2000 | Alston ........................ | 375/372 |
| 6,226,698 B1 | * | 5/2001 | Yeung et al. ................. | 710/57 |

FOREIGN PATENT DOCUMENTS

JP    5-20864    1/1993

\* cited by examiner

*Primary Examiner*—Fritz Fleming
*Assistant Examiner*—David Martinez
(74) *Attorney, Agent, or Firm*—Wenderoth, Lind & Ponack, L.L.P.

(57) ABSTRACT

An extending circuit for memory includes an output data effective signal generator for, when a status signal from a next-stage FIFO circuit represents a data writable state, asserting a write enable signal from the next-stage FIFO circuit, and enabling data to be written into the next-stage FIFO circuit. The extending circuit for memory also includes an internal FIFO write enable generator for receiving a status signal from the next-stage FIFO circuit, asserting an internal FIFO write enable signal, and enabling data to be written into an internal FIFO circuit of the extending circuit for memory, when the next-stage FIFO circuit is in a data unwritable state.

3 Claims, 5 Drawing Sheets

EXTENDING CIRCUIT FOR MEMORY AND TRANSMITTING-RECEIVING DEVICE USING EXTENDING CIRCUIT FOR MEMORY

BACKGROUND OF THE INVENTION

1. Field of the Invention

The present invention relates to an extending circuit for memory and a transmitting-receiving device using the extending circuit for memory that are applied in digital data communication or the like.

2. Description of the Related Art

In digital data communication, data processing speeds on a transmission side and a reception side should be equal to each other in principle. Particularly in fields of mobile communication and the like, however, average data processing speeds on both sides are equal with each other, but the processing speeds on both sides are different for a short time. In such a case, FIFO (First In First Out) circuits are used in order to absorb the difference in the processing speeds. The FIFO circuits are first in first out circuits for literally outputting data according to an input order. As a memory capacity of the FIFO circuit becomes larger, a larger speed difference can be absorbed instantaneously. Enlargement of the memory capacity, however, causes a rise in the cost. Normally, a balance between the rise in the cost and the processing ability is considered according to applications or the like of the FIFO circuits, and the memory capacity is determined in a fixed manner. In the case where the application of the FIFO circuits is changed, some techniques for extending the memory capacity at a later time are disclosed (for example, see Japanese Patent Application Laid-Open No. 05-020864 (1993) as Patent Document 1 which relates to the invention of this application).

In the above-mentioned prior technique, in the case or the like where the memory capacity of the FIFO circuit is insufficient, it is difficult to extend the memory capacity later. As mentioned in the Patent Document 1, some techniques for extending the memory capacity later are disclosed, but various restrictions are placed on the extension of the memory capacity. It is thus difficult to enlarge the memory capacity of the existing FIFO circuits instantly and simply.

SUMMARY OF THE INVENTION

It is, therefore, an object of the present invention to obtain an extending circuit for memory which is capable of enlarging the memory capacity instantly and simply as the need arises.

Further, there is a possibility that the memory capacity of either an existing transmission FIFO circuit or reception FIFO circuit is insufficient and the other one is sufficient depending on a change in a service condition of communication devices or the like. This state may be possibly reversed suddenly. In such a case, the object of the present invention is also to realize a transmitting-receiving device using an extending circuit for memory which is capable of executing normal transmission and reception using a small memory capacity by instantly connecting the extending circuit for memory with the reception FIFO circuit or the transmission FIFO circuit in a switching manner. According to a first aspect of the invention, to accomplish the above object, an extending circuit for memory is provided which has an internal FIFO circuit and is connected with an external FIFO circuit, in order to extend memory capacity used for writing input data. The extending circuit for memory comprises: an output data effective signal generator which, when judging that the external FIFO circuit can write data, based on a status output from the external FIFO circuit, makes the external FIFO circuit perform a writing operation, and outputs the input data into the external FIFO circuit; and an internal FIFO write enable generator which, when judging that the external FIFO circuit can not write data, based on the status signal output from the external FIFO circuit, makes the internal FIFO circuit perform a writing operation, and writes the input data into the internal FIFO circuit of the extending circuit for memory.

Further, the extending circuit for memory may also comprise: an internal FIFO read enable generator which, when judging that the external FIFO circuit can write data and the internal FIFO circuit has memory data, based on the status signal output from the external FIFO circuit and a status signal output from the internal FIFO circuit, makes the internal FIFO circuit perform a reading operation, reads the memory data out from the internal FIFO circuit, and outputs the memory data to the external FIFO circuit; and an output data generator which, when the external FIFO circuit is judged to be able to write data, the internal FIFO circuit is judged as having memory data and the input data is received, outputs, prior to the input data, the memory data read out from the internal FIFO circuit to the external FIFO circuit.

According to a second aspect of the invention, to accomplish the above object, there is provided a transmitting-receiving device using an extending circuit for memory for enabling the extending circuit for memory as described above to be connected with either a transmission FIFO circuit or a reception FIFO circuit in a switching manner in order to extend a memory capacity. The transmitting-receiving device uses the extending circuit for memory and comprises: a first selector for enabling either a transmission signal system or a reception signal system to be connected with the extending circuit for memory in a switching manner; a second selector for enabling a status signal from either the transmission FIFO circuit or the reception FIFO circuit to be connected with the internal FIFO write enable generator, the output data effective signal generator, and the internal FIFO read enable generator of the extending circuit for memory in a switching manner;

a third selector for enabling the transmission FIFO circuit to be connected with either the output data generator and the output data effective signal generator of the extending circuit for memory or the transmission signal system in a switching manner; and a fourth selector for enabling the reception FIFO circuit to be connected with either the output data generator and the output data effective signal generator of the extending circuit for memory or the reception signal system in a switching manner.

Further, the transmitting-receiving device using the extending circuit for memory may comprise: a control section for:

receiving status signals from the transmission FIFO circuit and the reception FIFO circuit, connecting the first selector with the reception signal system and connecting the second and the third selectors with the reception selector in a switching manner when the transmission FIFO circuit is in a data writable state and the reception FIFO circuit is in a data unwritable state, and receiving the status signals from the transmission FIFO circuit and the reception FIFO circuit, connecting the first selector with the transmission signal system and connecting the second and the third selectors with the transmission selector in a switching manner, when the reception FIFO circuit is in a data writable state and the transmission FIFO circuit is in a data unwritable state.

The above and other objects and features of the present invention will become apparent from the following detailed description and the appended claims with reference to the accompanying drawings.

DETAILED DESCRIPTION OF THE PREFERRED EMBODIMENTS

Embodiments of the present invention are explained below in the form of concrete examples.

Concrete First Example 1

In this concrete example, in order to extend memory capacity with respect to an existing FIFO circuit, an extending circuit for memory is provided which is capable of realizing the extension of memory by connecting instantly and simply to the existing FIFO circuit. Accordingly, with respect to the extending circuit for memory, the existing FIFO circuit is used as an external FIFO circuit, i.e. a next-stage FIFO circuit.

The following four functions are added to the extending circuit for memory in order to maintain a first in first out principle. (1) When a next-stage FIFO circuit is in a writable state, namely, the next-stage FIFO circuit is empty, input data are transmitted directly to the next-stage FIFO circuit. (2) When the next-stage FIFO circuit is in an unwritable state, namely, the next-stage FIFO circuit is full (not empty), input data are stored into an internal FIFO circuit.

(3) When the next-stage FIFO circuit is in a writable state, namely, the next-stage FIFO circuit is empty and data are stored in the internal FIFO circuit, the data stored in the internal FIFO circuit are transmitted to the next-stage FIFO circuit. (4) When the next-stage FIFO circuit is in a writable state, namely, the next-stage FIFO circuit is empty, data are stored in the internal FIFO circuit and the circuit receives the input data, the data stored in the internal FIFO circuit, serving as memory data, are transmitted to the next-stage FIFO circuit preferentially.

Further, the internal FIFO circuit and the added circuits for adding the above four functions are blocked so that they can be connected with before and after the existing FIFO circuit instantly and simply. An Input/Output node of the block is made to be similar to the existing FIFO circuit. In order to achieve the above object, the extending circuit for memory of the concrete example is constituted as follows.

Figure 1:
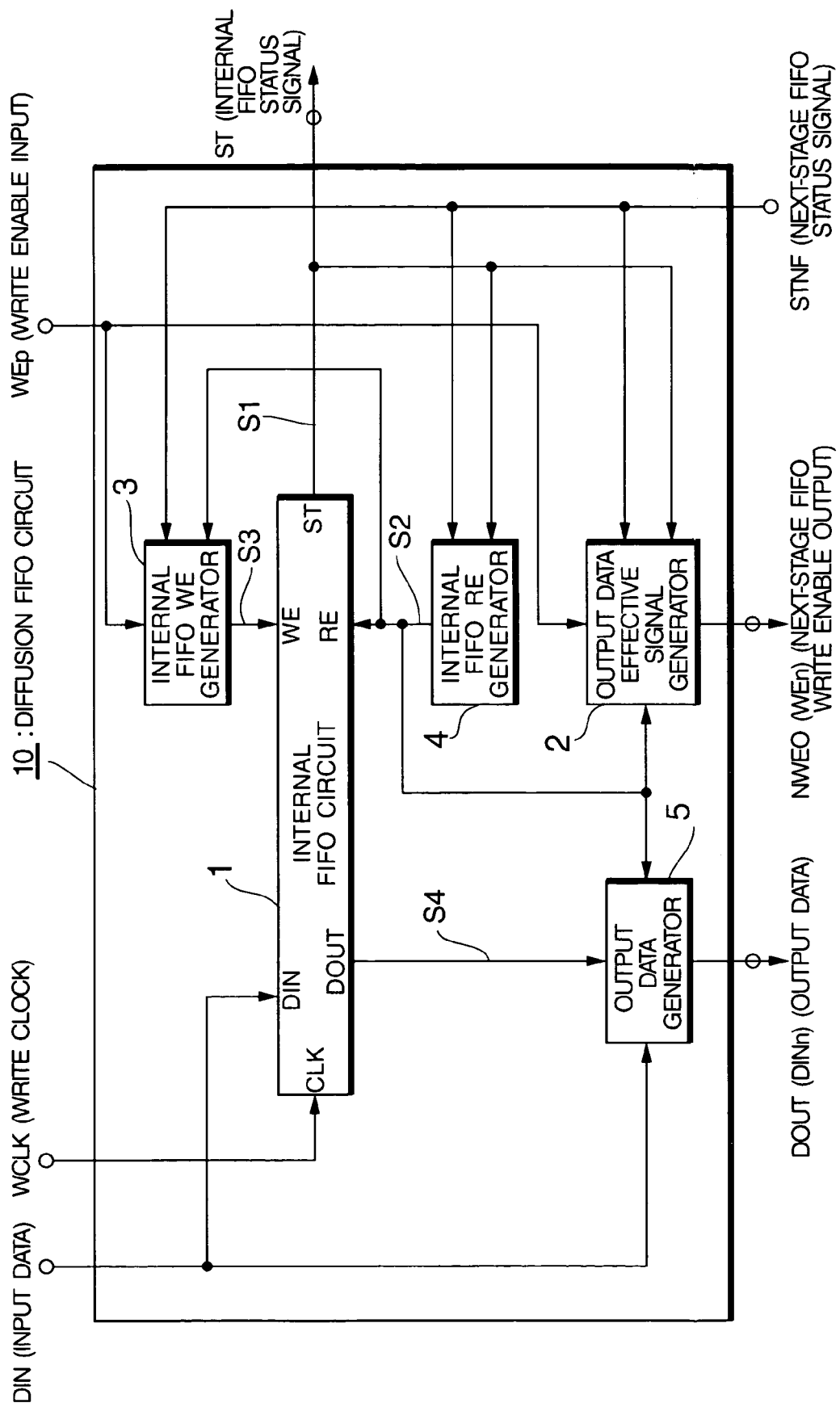
FIG. 1 is a block diagram of a constitution according to a concrete first example.

FIG. 1 is a block diagram of the constitution according to the first concrete example.

According to FIG. 1, the extending circuit for memory 10 of the first concrete example comprises an internal FIFO circuit 1, an output data effective signal generator 2, an internal FIFO write enable generator 3, an internal FIFO read enable generator 4, and an output data generator 5.

The internal FIFO circuit 1 is similar to a prior (existing) FIFO circuit, and has a CLK node for receiving a clock signal, a WE node for receiving a write enable signal, a RE node for receiving a read enable signal, a DIN node for receiving input data, a DOUT node for outputting data, and a ST node for outputting a difference between an internal write counter value and a read counter value as status signals.

The timing of signals at the respective nodes is explained with reference to the drawings.

Figure 2:
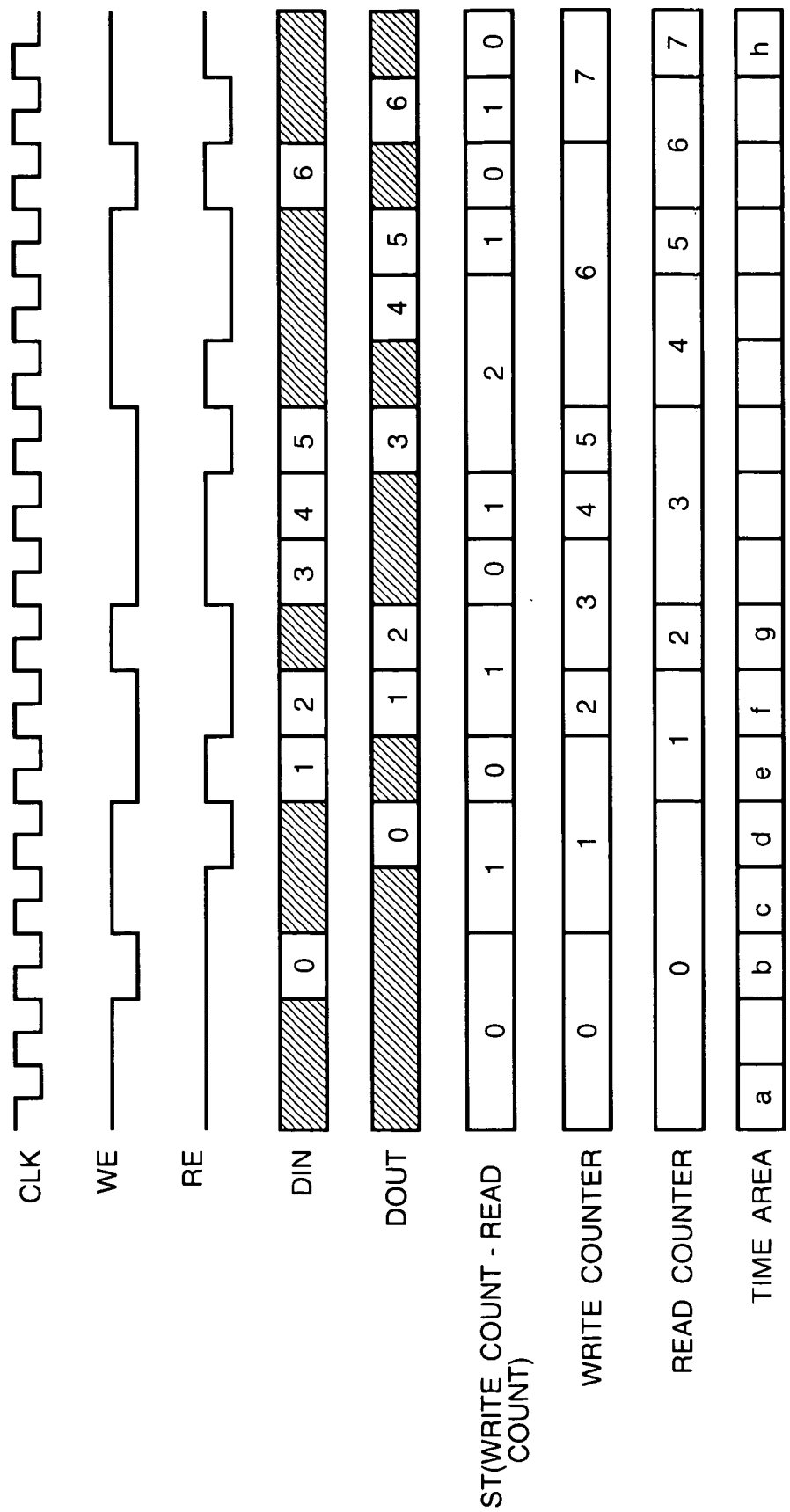
FIG. 2 is a time chart of an internal FIFO circuit.

FIG. 2 is a time chart of the internal FIFO circuit 1.

FIG. 2 shows signal states at the CLK node, the WE node, the RE node, the DIN node, the DOUT node, the ST node, the write counter and the read counter in this order. The bottom part of FIG. 2 shows common time areas in the respective signal states. One example of the respective signal states in the respective time areas is explained. Low level (L level) at the WE node and the RE node are in an assertion state.

Time Area "a"

Since both the WE node and the RE node are at a high level (H level) and both the write counter and the read counter indicate zero, the ST node is maintained at 0.

Time Area "b"

The WE node is asserted (L level), and data 0 are input into the DIN node. The data 0 are stored in an internal memory (not shown).

Time Area "c"

The write counter counts the data 0 in the time area "b" as being delayed by one clock so as to indicate 1. The ST node, therefore, becomes 1.

Time Area "d"

While the WE node is at H level, the RE node is asserted (L level), and the data 0 stored in the internal memory are output from the DOUT node.

Time Area "e"

While the RE node is at H level, the WE node is asserted, and data 1 are output into the DIN node. The data 1 are stored in the internal memory. The read counter counts the data 0 in the time area "d" as being delayed by one clock so as to indicate 1. The ST terminal, therefore, becomes 0.

Time Area "f"

The WE node is asserted and data 2 are input into the DIN node. The data 2 are stored in the internal memory. Further, the RE node is asserted, and the data 1 stored in the time area "e" are output from the DOUT node. The write counter counts the data 1 in the time area "e" as being delayed by one clock so as to indicate 2. The ST counter, therefore, becomes 1.

Time Area "g"

While the WE node is at H level, the RE node is asserted, and the data 2 stored in the time area "f" are output from the DOUT node. The write counter counts the data 2 in the time area "f" as being delayed by one clock so as to indicate 3. The read counter counts the data 1 in the time area "f" as being delayed by one clock so as to indicate 2. The ST counter, therefore, becomes 1.

A similar operation is repeated until the time area "h".

As explained above, when the WE node is at L level (asserted), the input data (DIN) into the internal FIFO circuit 1 synchronize with a clock signal (CLK) so as to be stored in the internal memory. When the input data are stored, the write counter increases by one as being delayed by one clock. Moreover, when the RE node is at L level (asserted), the data stored in the internal memory are read in synchronization with the clock signal (CLK). Further, the status signal (ST) represents a difference between a counted value of the write counter and a counted value of the read counter, namely, a quantity of the data stored in the internal memory.

Again with reference to FIG. 1, the explanation as to the constitution of the first concrete example is continued.

The output data effective signal generator 2 receives (monitors) a status signal (STNS) of a next-stage FIFO circuit, and asserts a next-stage FIFO write enable signal (WEn) when data can be written into the next-stage FIFO circuit so as to enable the data to be written into the next-stage FIFO circuit. That is to say, the output data effective signal generator 2 outputs an output data effective signal NWEO representing whether data (DOUT) to be output to the extending circuit for memory 10 is effective or ineffective. The output data effective signal NWEO functions as a write enable signal (WEn) at the next stage.

A write enable signal (WEp) transmitted from a previous stage to the extending circuit for memory 10, a status signal S1 from the internal FIFO circuit, a status signal STNF from a next-stage FIFO circuit, and an internal FIFO read enable signal S2 output by the internal FIFO read enable generator 4, as described below, are input into the output data effective signal generator 2. When the internal FIFO read enable signal S2 is asserted (L level) or the next-stage FIFO circuit is in a data writable state, namely, when the status signal of the next-stage FIFO is at H level, the output data effective signal NWEO becomes L level. This state is equivalent to the write enable signal (WEn) from the next-stage FIFO circuit being asserted.

The internal FIFO write enable generator 3 receives (monitors) the status signal (STNS) from the next-stage FIFO circuit, and asserts an internal FIFO write enable signal (S3) when the next-stage FIFO circuit is in a data unwritable state, so as to enable input data (DIN) to be written into the internal FIFO circuit 1. A status signal (STNS) from the next-stage FIFO circuit and an internal FIFO read enable signal S2 output by the internal FIFO read enable generator 4, as described below, are input into the internal FIFO write enable generator 3.

When the next-stage status signal (STNF) is at L level (a next-stage memory is full), the internal FIFO write enable generator 3 receives the write enable signal WEp from the previous stage, and asserts (L level) the internal FIFO write enable signal (S3). Moreover, when the internal FIFO read enable signal S2 output by the internal FIFO read enable generator 4 is asserted, the internal FIFO write enable generator 3 receives the write enable signal WEp from the previous stage and asserts (L level) the internal write enable signal (S3).

The internal FIFO read enable generator 4 receives (monitors) a status signal (STNF) from the next-stage FIFO circuit. When the next-stage FIFO circuit is in a data writable state, the internal FIFO read enable generator 4 receives (monitors) the status signal (S1) from the internal FIFO circuit 1, and the internal memory is not empty, the internal FIFO read enable generator 4 asserts the internal FIFO read enable signal (S2) so as to output the data stored in the memory.

The output data generator 5 receives input data and outputs the input data to the next-stage FIFO circuit, and preferentially reads the data stored in the internal FIFO circuit 1 instead of the input data so as to output them to the next-stage FIFO circuit when the internal FIFO read enable signal is asserted. This output becomes input data (DINn) into a next-stage FIFO circuit.

All the above components are integrated or made into a module, so as to compose the extending circuit for memory 10. The node DIN receives input data, the node WCLK receives a clock signal, the node WEp receives a previous-stage write enable signal, a node ST outputs a status signal, a node STNF receives a status signal from a next-stage FIFO circuit, a node NWEO outputs a write enable signal to the next-stage FIFO circuit, and the node DOUT outputs next-stage FIFO data.

Operation of the First Concrete Example

Figure 3:
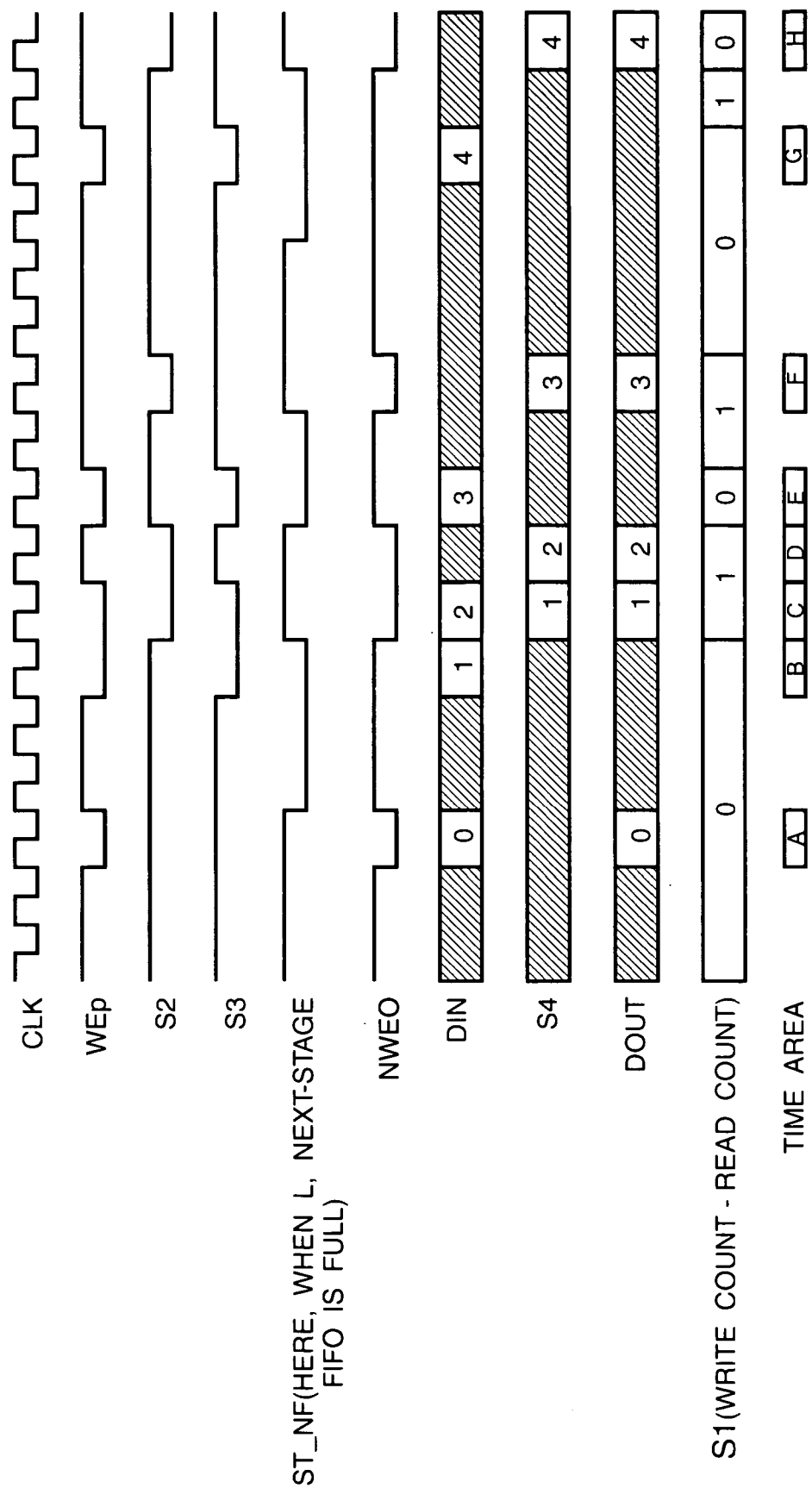
FIG. 3 is a time chart of an xtending circuit for memory.

FIG. 3 is a time chart of the extending circuit for memory.

FIG. 3 shows states of a clock signal (CLK), a write enable input signal (WEp), an internal FIFO read enable signal (S2), an internal FIFO write enable signal (S3), a next-stage FIFO status signal (STNF), an output data effective signal (NWEO), an input data (DIN), an internal FIFO output data (S4), an output data (DOUT), and an internal FIFO status signal (S1) in this order. The bottom portion of FIG. 3 shows time areas common in the respective signals. L levels of the signals WEp, S2 and S3 are in an assertion state. When the STNF signal is at L level, the next-stage FIFO circuit is full (in an unwritable state). One example of the signal states in the time areas is explained.

Time Area A

The write enable signal (WEp) is asserted, and 0 is received as input data (DIN). Since a next-stage FIFO status signal (STNF) is at H level, the next-stage FIFO circuit is in a data writable state. The input data (DIN0), therefore, are not stored in the internal FIFO circuit and pass directly through the output data generator 5 so as to be output (DOUT) as input data (DINn). Moreover, since the next-stage FIFO circuit is in a data writable state (STNF is at H level), the output data effective signal generator 2 sets the output data effective signal (NWEO) at L level. This state is such that the write enable signal (WEn) from the next-stage FIFO circuit is asserted.

Time Area B

The write enable signal (WEp) is asserted, but since the next-stage FIFO status signal (STNF) is at L level, the next-stage FIFO circuit is in a data unwritable state. The output data effective signal generator 2, therefore, sets the output data effective signal (NWEO) at H level. This state is such that the write enable signal (WEn) from the next-stage FIFO circuit is not asserted. Alternatively, the internal FIFO write enable generator 3 asserts the internal FIFO write enable signal (S3). As a result, data 1 as the input data (DIN) are stored in the internal FIFO circuit 1.

Time Area C

The write enable signal (WEp) is asserted, but the internal FIFO read enable signal (S2) is also asserted. Moreover, since the next-stage FIFO status signal (STNF) is at H level, the next-stage FIFO circuit is in a data writable state. In this case, the output data generator 5 first reads the data 1 stored in the internal FIFO circuit 1 (S4), and transmits the data 1 as output data (DOUT) to the next-stage FIFO circuit. Data 2 as input data (DIN) are stored in the internal FIFO circuit 1. Further, the write counter of the internal FIFO circuit 1 counts the data 1 received in the time area B as being delayed by one clock so as to indicate 1. The internal FIFO status signal (S1), therefore, becomes 1.

Time Area D

The internal FIFO read enable signal (S2) is asserted. Moreover, since the next-stage FIFO status signal (STNF) is at H level, the output data generator 5 reads the data 2 stored in the internal FIFO circuit 1 (S4) and transmits the data 2 as the output data (DOUT) to the next-stage FIFO circuit. Further, the write counter of the internal FIFO circuit 1 counts the data 2 received in the time area C as being delayed by one clock so as to indicate 2. Further, the read counter of the internal FIFO circuit 1 counts the data 1 read in the time area C as being delayed by one clock so as to indicate 1. The internal FIFO status signal (S1), therefore, becomes 1.

Time Area E

The write enable signal (WEp) is asserted, but since the next-stage FIFO status signal (STNF) is at L level, the internal FIFO write enable generator 3 asserts the internal FIFO write enable signal (S3). As a result, the data 3 as the input data (DIN) are stored in the internal FIFO circuit 1. Moreover, the read counter of the internal FIFO circuit 1 counts the data 2 read in the time area D as being delayed by one clock so as to indicate 2. The internal FIFO status signal (S1), therefore, becomes 0.

Time Area F

Since data 3 are stored in the internal FIFO circuit 1 and the next-stage FIFO status signal (STNF) is at H level, the internal FIFO read enable generator 4 asserts the internal FIFO read enable signal (S2). As a result, the output data generator 5 reads the data 3 stored in the internal FIFO circuit 1 (S4), and transmits the data 3 as the output data (DOUT) to the next-stage FIFO circuit. Moreover, the read counter of the internal FIFO circuit 1 has already counted the data 3 read in the time area E as being delayed by one clock so as to indicate 3. The internal FIFO status signal (S1) is, therefore, 1.

Time Area G

The write enable signal (WEp) is asserted, but since the next-stage FIFO status signal (STNF) is at L level, the internal FIFO write enable generator 3 asserts the internal FIFO write enable signal (S3). As a result, data 4 as the input data (DIN) are stored in the internal FIFO circuit 1. Moreover, the read counter of the internal FIFO circuit 1 has counted the data 3 read in the time area F as being delayed by one clock so as to indicate 3. The internal FIFO status signal (S1) is, therefore, 0.

Time Area H

Since the data 4 are stored in the internal FIFO circuit 1 and the next-stage FIFO status signal (STNF) is at H level, the internal FIFO read enable generator 4 asserts the internal FIFO read enable signal (S2). As a result, the output data generator 5 reads the data 4 stored in the internal FIFO circuit 1 (S4), and transmits the data 4 as the output data (DOUT) to the next FIFO circuit. Further, the write counter of the internal FIFO circuit 1 has already counted the data 4 read in the time area G as being delayed by one clock so as to indicate 4. Further, the read counter of the internal FIFO circuit 1 has already counted the data 3 read in the time area F as being delayed by one clock so as to indicate 4. The internal FIFO status signal (S1) is, therefore, 0.

The above-mentioned operation of the first concrete example is compiled so as to be summarized in the following logic.

(1) When the next-stage FIFO circuit is in a writable state, namely, when the next-stage FIFO circuit is empty, the extending circuit for memory transmits input data directly to the next-stage FIFO circuit. The time area A in FIG. 3 corresponds to this case.

(2) When the next-stage FIFO circuit is in an unwritable state, namely, the next-stage FIFO circuit is full (not empty), the extending circuit for memory stores the input data into the internal FIFO circuit 1. The time areas B and E in FIG. 3 correspond to this case.

(3) When the next-stage FIFO circuit is in a writable state, namely, when the next-stage FIFO circuit is empty and data are stored in the internal FIFO circuit, the extending circuit for memory transmits the data stored in the internal FIFO circuit to the next-stage FIFO circuit. The time areas F and H in FIG. 3 correspond to this case.

(4) When the next-stage FIFO circuit is in a writable state, namely, when the next-stage FIFO circuit is empty and data are stored in the internal FIFO circuit and the input data are received, the extending circuit for memory preferentially transmits the data stored in the internal FIFO circuit to the next-stage FIFO circuit. The time area C in FIG. 3 corresponds to this case.

In the above explanation, the extending circuit for memory is operated by one clock signal (CLK), but the present invention is not limited to this example. That is to say, the clock signal of the data input is not necessarily equal with the clock signal of the data output, and thus clock signals with different timings may be used. Moreover, in the above explanation, the status signal (ST) represents a quantity of the data stored in the internal memory, but the present invention is not limited to this example. That is to say, any signal may be used as long as it can be used to discriminate whether the internal memory is full or empty.

Further, the above explanation refers to only the case where one extending circuit for memory of the present invention is added before and after the existing FIFO circuit, but the present invention is not limited to this example. Another example is explained with reference to FIG. 4.

Figure 4:
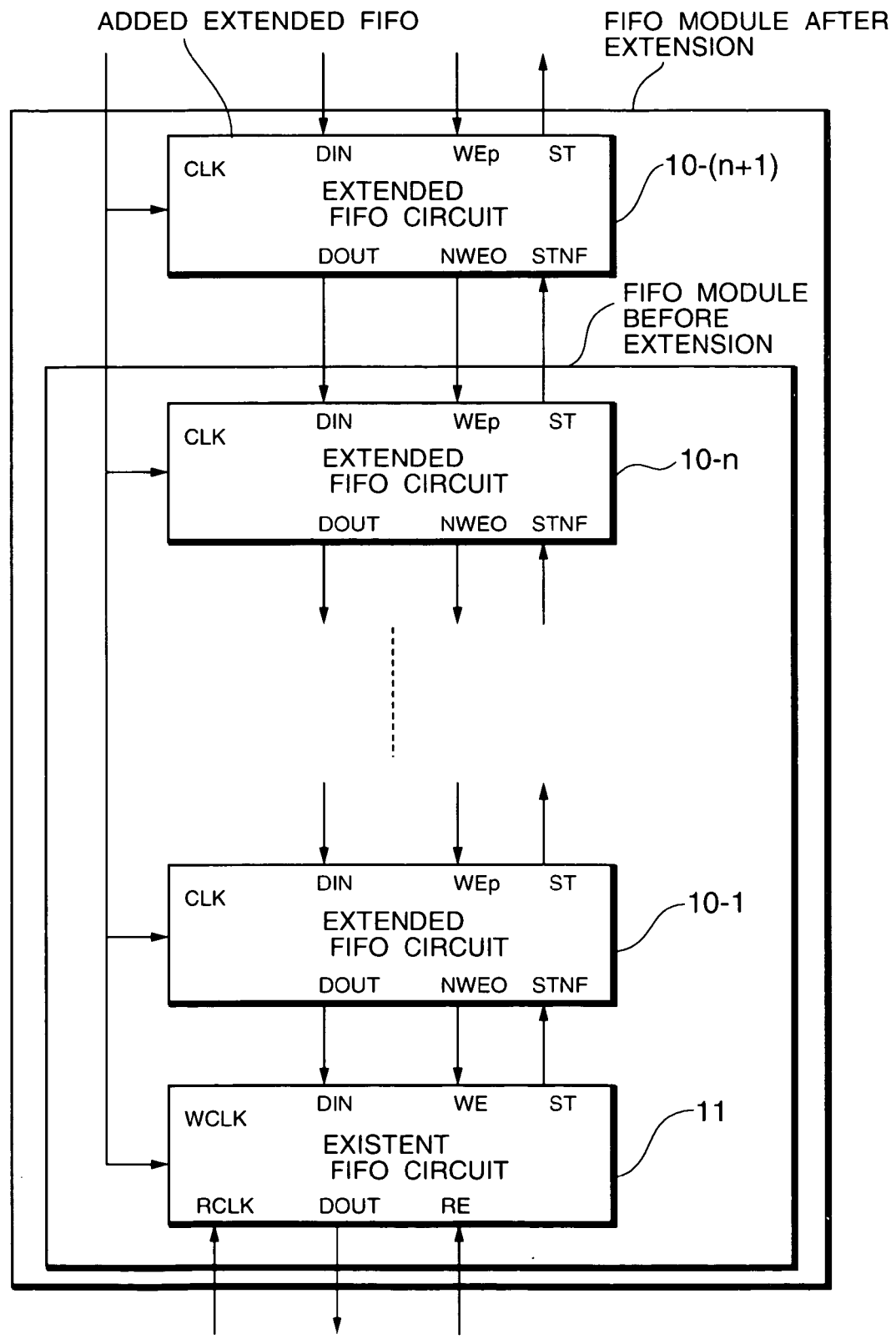
FIG. 4 is a connecting diagram of a FIFO module using the extending circuit for memory.

FIG. 4 is a connecting diagram of an FIFO module using the extending circuit for memory.

As shown in FIG. 4, the extending circuits for memory 10-1 to 10-n of the present invention are connected with the existing FIFO circuit 11 in a dependent manner, so that an FIFO module using the extending circuits for memory can be constituted.

As shown in FIG. 4, DIN of the existing FIFO circuit 11 is connected with DOUT of the extending circuit for memory 10-1, WE of the existing FIFO circuit 11 is connected with NWEO of the extending circuit for memory 10-1, and ST of the existing FIFO circuit 11 is connected with STNF of the extending circuit for memory 10-1. In the connection between the extending circuits for memory, DIN of the next-stage extending circuit for memory is connected with DOUT of the previous-stage FIFO circuit, WEp of the next-stage extending circuit for memory is connected with NWEO of the previous-stage extending circuit for memory, and ST of the next-stage extending circuit for memory is connected with STNF of the previous-stage extending circuit for memory. Further, a clock signal is supplied to all the FIFO circuits. In such a manner, the extended FIFO module can be constituted easily.

As explained above, when the extending circuit for memory is constituted, as shown in FIG. 4, the extending circuits for memory are connected in the dependent manner, so that the extended FIFO module can be constituted easily. Moreover, an extending circuit for memory 10−(n+1) can be easily added to the extended FIFO module. As a result, when the memory capacity of the FIFO circuit is insufficient, the memory capacity can be increased instantly and easily as the need arises.

In this case, with respect to the extending circuit for memory 10−(n+1), the extending circuit for memory 10−n becomes the external FIFO circuit, i.e., the next-stage FIFO circuit.

Moreover, with respect to the previous-stage extending circuit, the next-stage extending circuit for memory is used as the external FIFO circuit.

Second Concrete Example

In this concrete example, the transmitting-receiving device using the extending circuit for memory which is capable of carrying out transmission and reception using the FIFO circuit with a small memory capacity is realized. There is a possibility that the memory capacity of either the existing transmission FIFO circuit or reception FIFO circuit is insufficient, and the other memory capacity is enough according to a change in the service condition of the communication device. Further, this situation may be abruptly reversed. In such a case, the extending circuits for memory realized in the first concrete example can be connected with the reception FIFO circuit or the transmission FIFO circuit in a switching manner. In order to achieve this object, the transmitting-receiving device using the extending circuit for memory in this concrete example is constituted as follows.

Figure 5:
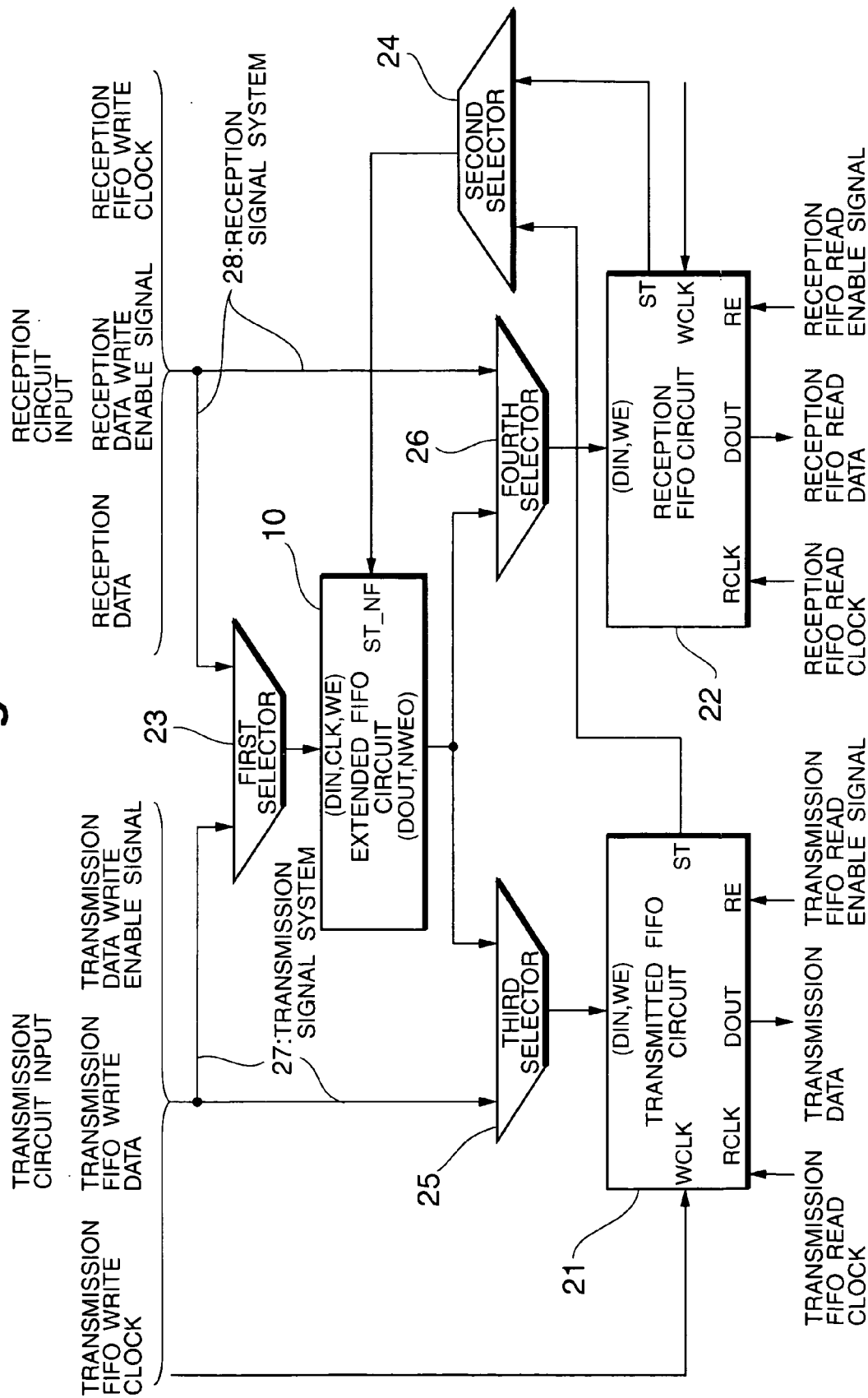
FIG. 5 is a block diagram of a transmitting-receiving device using the extending circuit for memory.

FIG. 5 is a block diagram of the transmitting-receiving device using the extending circuit for memory.

With reference to FIG. 5, the transmitting-receiving device using the extending circuit for memory comprises an extending circuit for memory 10, a transmission FIFO circuit 21, a reception FIFO circuit 22, a first selector 23, a second selector 24, a third selector 25 and a fourth selector 26.

The first selector 23 can connect either a transmission signal system 27 or a reception signal system 28 with the extending circuit for memory 10 in a switching manner.

The second selector 24 can connect a status signal from either the transmission FIFO circuit 21 or the reception FIFO circuit 22 with the internal FIFO write enable generator 3 (FIG. 1), the output data effective signal generator 2 (FIG. 1), and the internal FIFO read enable generator 4 (FIG. 1) of the extending circuit for memory 10 in a switching manner.

The third selector 26 can connect either the output data generator 5 (FIG. 1) and the output data effective signal generator 2 (FIG. 1) of the extending circuit for memory 10 or the transmission signal system 27 with the transmission FIFO circuit 21 in a switching manner.

The fourth selector 26 can connect either the output data generator 5 (FIG. 1) and the output data effective signal generator 2 (FIG. 1) of the extending circuit for memory 10 or the transmission signal system 28 with the transmission FIFO circuit 22 in a switching manner.

The first selector 23, the second selector 24, the third selector 25 and the fourth selector 26 are switched so that the extending circuit for memory 10 can be connected with either the transmission FIFO circuit 21 or the reception FIFO circuit 22. As a result, in the case where the memory capacity of the transmission FIFO circuit 21 is insufficient and the memory capacity of the reception FIFO circuit 22 is sufficient, the extending circuit for memory 10 can be connected with the transmission FIFO circuit 21. Further, in the case where the memory capacity of the transmission FIFO circuit 21 is sufficient and the memory capacity of the reception FIFO circuit 22 is insufficient, the extending circuit for memory 10 can be connected with the reception FIFO circuit 22.

The memory capacity of the transmission FIFO circuit 21 and the memory capacity of the reception FIFO circuit 22 are determined as to their sufficient/insufficient state based on the respective status signals. A control unit for automatically switching the first selector 23, the second selector 24, the third selector 25, and the fourth selector 26 is further provided, so that the transmitting-receiving device using the extending circuit for memory, which is capable of switching more accurately at higher speed, can be obtained.

The above explanation refers to only the switching between the two FIFO circuits of the transmission FIFO circuit 21 and the reception FIFO circuit 22, but the present invention is not limited to this example. That is to say, the switching among three or more FIFO circuits can be realized by a similar technique.

The constitution of the second concrete example explained above is adopted, so that the extending circuit for memory can be connected with either the transmission FIFO circuit or the reception FIFO circuit. For this reason, in the case where the memory capacity of the transmission FIFO circuit is insufficient and the memory capacity of the reception FIFO circuit is sufficient, the extending circuit for memory can be connected with the transmission FIFO circuit. Moreover, in the opposite case, the extending circuit for memory can be connected with the reception FIFO circuit. As a result, the memory capacity of the extending circuit for memory can be utilized effectively.

EFFECTS OF THE INVENTION

The extending circuit for memory according to the present invention is constituted as explained above, so that the following effects can be obtained.

1. The extending circuits for memory are connected in a dependent manner so that the extended FIFO module can be constituted easily.

2. The extending circuit for memory can be further added to the extended FIFO module easily.

3. As a result, in the case where the memory capacity of the FIFO circuit is insufficient, the memory capacity can be increased at a later time instantly and easily as the need arises.

4. Further, the extending circuit for memory of the present invention is used in the transmitting-receiving device using extending circuit for memory and connected with the reception FIFO circuit or the transmission FIFO circuit instantly in a switching manner, so that the extending circuit for memory can be connected with either the transmission FIFO circuit or the reception FIFO circuit. For this reason, in the case where the memory capacity of the transmission FIFO circuit is insufficient and the memory capacity of the reception FIFO circuit is sufficient, the extending circuit for memory can be connected with the transmission FIFO circuit. Further, in the opposite situation, the extending circuit for memory can be connected with the reception FIFO circuit. As a result, the memory capacity of the extending circuit for memory can be utilized effectively.

What is claimed is:

1. An extending circuit for memory connected to an external FIFO circuit, said extending circuit for memory being operable to extend a memory capacity used for writing input data to said extending circuit for memory to the external FIFO circuit, said extending circuit for memory comprising:

an internal FIFO circuit;

an output data effective signal generator operable to receive a first status signal output from the external FIFO circuit indicating whether or not the external FIFO circuit can write data therein; and an internal FIFO write enable generator operable to receive the first status signal output from the external FIFO circuit indicating whether or not the external FIFO circuit can write data therein;

wherein when the first status signal received by said internal FIFO write enable generator indicates that the external FIFO cannot write data therein, said internal FIFO write enable generator is operable to cause said internal FIFO circuit to perform a writing operation of writing the input data into said internal FIFO circuit; and wherein when the first status signal received by said output data effective signal generator indicates that the external FIFO can write data therein, said output data effective signal generator is operable to output the input data to the external FIFO circuit directly without passing through said internal FIFO circuit, and cause the external FIFO circuit to perform a writing operation of writing the input data into the external FIFO circuit.

2. The extending circuit for memory according to claim 1, wherein said internal FIFO circuit is operable to output a second status signal indicating whether or not said internal FIFO circuit has data written in said internal FIFO circuit.

3. The extending circuit for memory according to claim 2, further comprising:

an internal FIFO read enable generator operable to receive the first status signal output from the external FIFO circuit and the second status signal output from said internal FIFO circuit; and an output data generator operable to receive the data input to said extending circuit for memory and output data to the external FIFO circuit;

wherein when the first status signal received by said internal FIFO read enable generator indicates that the external FIFO can write data therein and when the second status signal received by said internal FIFO read enable generator indicates that said internal FIFO circuit has data written therein, said internal FIFO read enable generator is operable to cause said internal FIFO circuit to perform a reading operation of reading the data written in said internal FIFO circuit and outputting the read data to the external FIFO circuit; and wherein when said output data generator receives the data input to said extending circuit for memory, the external FIFO circuit outputs the first status signal indicating that the external FIFO circuit can write data therein and said internal FIFO circuit outputs the second status signal indicating that said internal FIFO circuit has data written therein, said output data generator is operable to output, prior to the received data input to said extending circuit for memory, the data written in said internal FIFO circuit and read out by said internal FIFO circuit to the external FIFO circuit.

* * * * *